United States Patent
Yi et al.

(10) Patent No.: US 11,134,308 B2
(45) Date of Patent: Sep. 28, 2021

(54) ADAPTING INTERACTIONS WITH A TELEVISION USER

(71) Applicant: Sony Corporation, Tokyo (JP)

(72) Inventors: Hyehoon Yi, San Diego, CA (US); David Young, San Diego, CA (US); Lindsay Miller, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/055,795

(22) Filed: Aug. 6, 2018

(65) Prior Publication Data

US 2020/0045370 A1    Feb. 6, 2020

(51) Int. Cl.
*H04N 21/442* (2011.01)
*G06F 3/16* (2006.01)
(Continued)

(52) U.S. Cl.
CPC ....... *H04N 21/44218* (2013.01); *G06F 3/167* (2013.01); *H04N 21/44008* (2013.01); *H04N 21/44016* (2013.01); *H04N 21/47214* (2013.01)

(58) Field of Classification Search
CPC ....... H04N 21/44218; H04N 21/44008; H04N 21/44016; H04N 21/47214; H04N 21/25;
(Continued)

(56) References Cited

U.S. PATENT DOCUMENTS 5,115,501 A    5/1992    Kerr
6,359,661 B1   3/2002    Nickum
(Continued)

FOREIGN PATENT DOCUMENTS

WO    WO03058518        7/2003
WO    WO2009/067670     5/2009
(Continued)

OTHER PUBLICATIONS

Thanks to Google, TV Ads Are About to Start Watching You; https://www.wired.com/2015/03/google-fiber-ads/ Klint Fin ley.
(Continued)

*Primary Examiner* — Jefferey F Harold
*Assistant Examiner* — Alexander Boyd
(74) *Attorney, Agent, or Firm* — Trellis IP Law Group, PC

(57) ABSTRACT

Implementations generally relate to adapting interactions with a television user. In some implementations, a method includes interacting with a user based on a first behavior pattern, wherein the first behavior pattern includes one or more predetermined behaviors. The method further includes observing one or more responses from the user, wherein the one or more responses are responsive to the one or more predetermined behaviors. The method further includes modifying at least one of the predetermined behaviors, wherein the modifying of the results in at least one modified behavior. The method further includes observing at least one change in one or more of the responses, wherein the at least one change is responsive to the at least one modified behavior. The method further includes interacting with the user based on a second behavior pattern, wherein the second behavior pattern includes one or more of the predetermined behaviors and the modified behavior.

14 Claims, 7 Drawing Sheets

(51) Int. Cl.
*H04N 21/44* (2011.01)
*H04N 21/472* (2011.01)

(58) Field of Classification Search
CPC .... H04N 21/251; H04N 21/45; H04N 21/466; H04N 21/4662; G06F 3/167
See application file for complete search history.

(56) References Cited

U.S. PATENT DOCUMENTS

| | | | |
|---|---|---|---|
| 7,774,815 B1 | 8/2010 | Allen | |
| 2002/0087498 A1 | 7/2002 | Yoshida | |
| 2003/0093280 A1 | 5/2003 | Oudeyer | |
| 2004/0034874 A1 | 2/2004 | Hord et al. | |
| 2007/0271518 A1* | 11/2007 | Tischer | H04N 21/44218 715/744 |
| 2007/0300185 A1 | 12/2007 | Macbeth et al. | |
| 2008/0130958 A1 | 6/2008 | Ziomek | |
| 2010/0138858 A1* | 6/2010 | Velazquez | H04N 21/443 725/33 |
| 2011/0032423 A1* | 2/2011 | Jing | H04N 21/43615 348/552 |
| 2013/0090930 A1 | 4/2013 | Monson | |
| 2014/0111689 A1 | 4/2014 | Kim | |
| 2014/0168277 A1* | 6/2014 | Ashley | G06F 3/1446 345/672 |
| 2014/0273717 A1 | 9/2014 | Judkins et al. | |
| 2015/0067787 A1 | 3/2015 | Stanasolovich | |
| 2015/0137937 A1 | 5/2015 | Smith | |
| 2016/0165038 A1* | 6/2016 | Lim | H04M 1/72569 715/728 |
| 2017/0220570 A1* | 8/2017 | Tilaye | H04N 21/44218 |
| 2017/0244834 A1 | 8/2017 | Flores | |
| 2017/0289766 A1 | 10/2017 | Scott | |
| 2017/0352351 A1 | 12/2017 | Kimura | |
| 2018/0068012 A1* | 3/2018 | O'Connor | G06F 16/5854 |
| 2018/0068226 A1* | 3/2018 | O'Connor | G10L 15/22 |
| 2018/0139067 A1 | 5/2018 | Josyula | |
| 2018/0182373 A1* | 6/2018 | Almudafar-Depeyrot | G10L 13/00 |
| 2019/0311718 A1* | 10/2019 | Huber | G06F 1/3231 |

FOREIGN PATENT DOCUMENTS

| | | |
|---|---|---|
| WO | WO2017/122900 | 7/2017 |
| WO | WO2017/189559 | 11/2017 |

OTHER PUBLICATIONS

WowWee Chip https://wowwee.com/chip CHiP is an intelligent, affectionate robot dog. With advanced sensors and smart accessories, CHiP is always aware, and ready to play. How you respond uniquely shapes his behavior, so there's no CHiP like your CHiP. WowWee Group Limited "Earlier in 2016robotdogchip.com/wowwee-chip-release-date/" https://mashable.com/2016/08/16/wowwee-chip-review/.

I-cybie http://www.theoldrobots.com/icybie.html the i-Cybie is a robotic pet that resembles a dog. It was manufactured by Silverlit Electronics. The i-Cybie robot responds to sound, touch, and voice commands using it's remote control. Silverlit Electronics "2005http://www.hightechscience.org/i-cybie.htm" http://www.hightechscience.org/i-cybie.htm.

Jibo https://www.jibo.com/learn-more Jibo experiences the world and reacts with expressive movements and responses. He loves to be around people and engage with people, and the relationships he forms are the single most important thing to him. He'll gladly tell you the weather or snap a photo, he'll also crack a joke while he's at it. Jibo Inc. "Oct. 2018https://venturebeat.com/2017/10/25/3-years-after-indiegogo-launch-social-robot-jibo-is-available-for-preorder/".

* cited by examiner

100

ADAPTING INTERACTIONS WITH A TELEVISION USER

BACKGROUND

Devices are increasingly using voice agents to interact with users. The current generation of voice agents are devoid of personality, and can be perceived to be emotionless or robotic to the user (e.g., lacking any emotion or feeling of empathy). While this does not affect the usefulness, it can make the experience awkward. Attempting to create an agent with personality has shortcomings because each person has a different preference and tolerance for particular personality traits. Conventional voice agents often create an awkward and undesirable user experience.

SUMMARY

Implementations generally relate to adapting interactions with a television user. In some implementations, a system includes one or more processors, and includes logic encoded in one or more non-transitory computer-readable storage media for execution by the one or more processors. When executed, the logic is operable to perform operations including interacting with a user based on a first behavior pattern, wherein the first behavior pattern includes one or more predetermined behaviors; observing one or more responses from the user, wherein the one or more responses are responsive to the one or more predetermined behaviors; modifying at least one of the predetermined behaviors, wherein the modifying of the results in at least one modified behavior; observing at least one change in one or more of the responses, wherein the at least one change is responsive to the at least one modified behavior; and interacting with the user based on a second behavior pattern, wherein the second behavior pattern includes one or more of the predetermined behaviors and the modified behavior.

With further regard to the system, in some implementations, at least one of the predetermined behaviors includes communicating with the user by voice. In some implementations, the at least one modified behavior includes conveying affects to the user. In some implementations, to modify at least one of the predetermined behaviors, the logic when executed is further operable to perform operations comprising modifying one or more voice characteristics. In some implementations, the at least one change in one or more of the responses comprises a positive reaction or a negative reaction. In some implementations, the logic when executed is further operable to perform operations comprising: detecting a notification to be delivered to the user; detecting when a commercial is being shown on a television; and delivering the notification to the user during the commercial. In some implementations, the logic when executed is further operable to perform operations comprising: determining an identity of the user; and presenting to the user a predetermined user interface that is associated with the user.

In some embodiments, a non-transitory computer-readable storage medium with program instructions thereon is provided. When executed by one or more processors, the instructions are operable to perform operations including interacting with a user based on a first behavior pattern, wherein the first behavior pattern includes one or more predetermined behaviors; observing one or more responses from the user, wherein the one or more responses are responsive to the one or more predetermined behaviors; modifying at least one of the predetermined behaviors, wherein the modifying of the results in at least one modified behavior; observing at least one change in one or more of the responses, wherein the at least one change is responsive to the at least one modified behavior; and interacting with the user based on a second behavior pattern, wherein the second behavior pattern includes one or more of the predetermined behaviors and the modified behavior.

With further regard to the computer-readable storage medium, in some implementations, at least one of the predetermined behaviors includes communicating with the user by voice. In some implementations, the at least one modified behavior includes conveying affects to the user. In some implementations, to modify at least one of the predetermined behaviors, the instructions when executed are further operable to perform operations comprising modifying one or more voice characteristics. In some implementations, the at least one change in one or more of the responses comprises a positive reaction or a negative reaction. In some implementations, the instructions when executed are further operable to perform operations comprising: detecting a notification to be delivered to the user; detecting when a commercial is being shown on a television; and delivering the notification to the user during the commercial. In some implementations, the instructions when executed are further operable to perform operations comprising: determining an identity of the user; and presenting to the user a predetermined user interface that is associated with the user.

In some implementations, a method includes interacting with a user based on a first behavior pattern, wherein the first behavior pattern includes one or more predetermined behaviors; observing one or more responses from the user, wherein the one or more responses are responsive to the one or more predetermined behaviors; modifying at least one of the predetermined behaviors, wherein the modifying of the results in at least one modified behavior; observing at least one change in one or more of the responses, wherein the at least one change is responsive to the at least one modified behavior; and interacting with the user based on a second behavior pattern, wherein the second behavior pattern includes one or more of the predetermined behaviors and the modified behavior.

With further regard to the method, in some implementations, at least one of the predetermined behaviors includes communicating with the user by voice. In some implementations, the at least one modified behavior includes conveying affects to the user. In some implementations, to modify at least one of the predetermined behaviors, the method further comprises modifying one or more voice characteristics. In some implementations, the at least one change in one or more of the responses comprises a positive reaction or a negative reaction. In some implementations, the method further comprises: detecting a notification to be delivered to the user; detecting when a commercial is being shown on a television; and delivering the notification to the user during the commercial.

A further understanding of the nature and the advantages of particular implementations disclosed herein may be realized by reference of the remaining portions of the specification and the attached drawings.

DETAILED DESCRIPTION

Implementations described herein adapt interactions with a television user. In various implementations, a system interacts with a user based on a first behavior pattern, which includes one or more predetermined behaviors. The system observes responses from the user, where the responses are responsive to the predetermined behaviors. As described in more detail herein, the system modifies one or more of the predetermined behaviors, which results in modified behaviors. The system observes if there are any changes in the user's responses, wherein the changes are responsive to the modified behaviors. The system continues interacting with the user based on a second behavior pattern, which includes one or more of the predetermined behaviors and the modified behavior.

Figure 1:
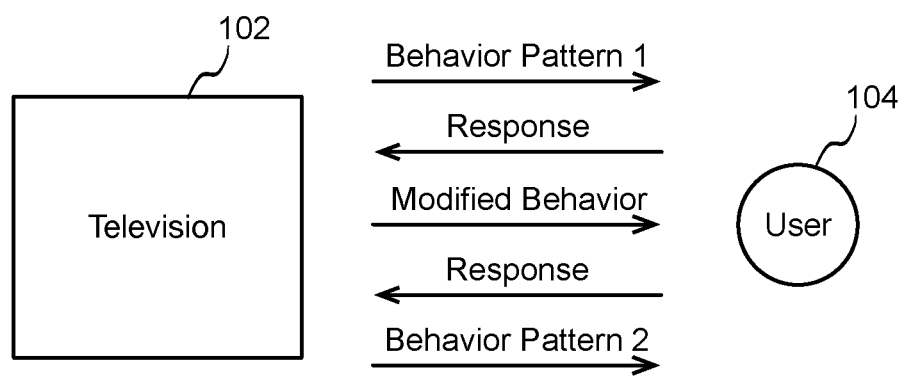
FIG. 1 illustrates a block diagram of an example television environment, which may be used for some implementations described herein.

FIG. 1 illustrates a block diagram of an example television environment 100, which may be used for some implementations described herein. In some implementations, television environment 100 includes a television 102, which interacts with a user 104. Television 102 interacts with user 104 based on behavior patterns. For example, television 102 may interact with user 104 based on a first behavior pattern (labeled Behavior Pattern 1), which may elicit a response from user 104. Television 102 may modify one or more behaviors, which in turn may elicit a response from user 104. In various implementations, television 102 may resume interacting with user 104 with a second behavior pattern (labeled Behavior Pattern 2), which includes at least some of the behaviors of the first behavior pattern and the modified behavior pattern. Example implementations are described in more detail herein.

In various implementations, television 102 includes a voice agent for interacting with the user. Television 102 also includes a built-in microphone and a built-in camera. As such, when the user makes different kinds of requests, television 102 may observe the user's facial expressions and see how the user responds. In various implementations, television 102 may use machine learning techniques in order to determine if particular communication styles are successful or not.

For ease of illustration, FIG. 1 shows one block for television 102. Block 102 may represent multiple systems and/or devices. In other implementations, television 102 may not have all of the components shown and/or may have other elements including other types of elements instead of, or in addition to, those shown herein. Television 102 may perform the implementations described herein alone or in combination with other devices. In various implementations, the system may stored unique user profiles for each user of multiple users.

Figure 2:
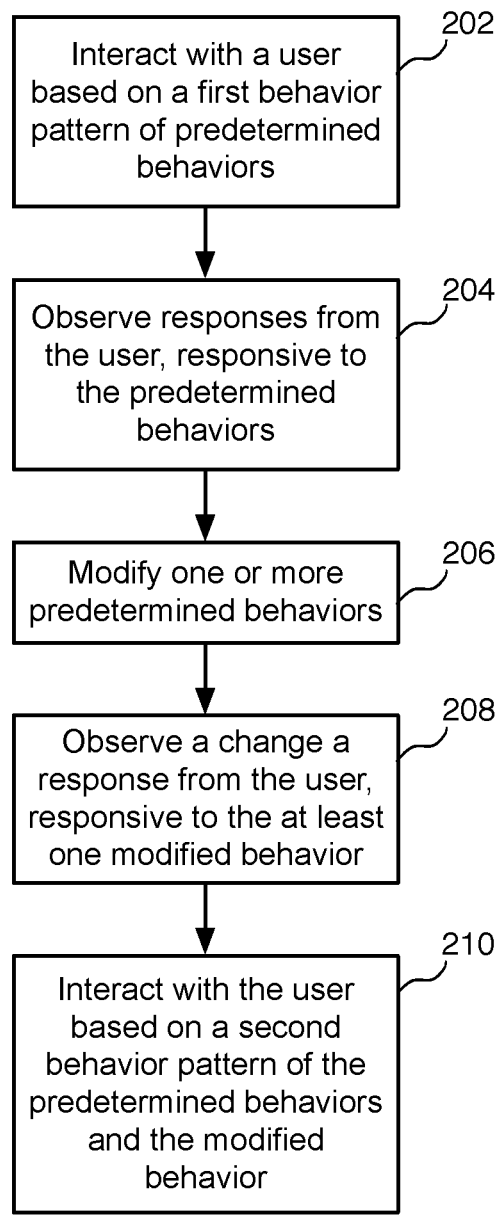
FIG. 2 illustrates an example flow diagram for adapting interactions with a television user, according to some implementations.

FIG. 2 illustrates an example flow diagram for adapting interactions with a television user, according to some implementations. Referring to both FIGS. 1 and 2, a method is initiated at block 202, where the system such as television 102 interacts with a user based on a first behavior pattern, wherein the first behavior pattern includes one or more predetermined behaviors. In various implementations described herein the system interacts by sounds such as by voice or with music or other sounds. In various implementations, a predetermined behavior may include communicating with the user by voice. In some implementations, a predetermined behavior may include providing particular information to the user (e.g., movie recommendations, etc.).

The predetermined behaviors may vary depending on the implementation. The system may use varying voice tones (e.g., high, low, cheery or calm, etc.), speed, level of engagement (e.g., proactive or passive; long answers or short answers, etc.) and other factors to build engagement. For example, the system when communicating by voice may speak with higher volume or lower volume. The system may speak more quickly or more slowly. The system may use a smooth voice or a less smooth voice, etc. The system may use a male voice, female voice, etc.

At block 204, the system observes one or more responses from the user, wherein the one or more responses are responsive to the one or more predetermined behaviors. For example, the system may observe facial expressions. The system may determine using facial and/or pattern recognition if the user is happy or unhappy, or confused.

At block 206, the system modifies at least one of the predetermined behaviors, wherein the modifying results in at least one modified behavior. In various implementations, the system modifies at least one of the predetermined behaviors by modifying one or more voice characteristics. For example, the system may communicate with the user with more volume and more slowly. Alternatively, the system may communicate in a more curt, direct, to the point manner. Such variations may range from subtle to overt.

In various implementations, a modified behavior includes conveying affects to the user. For example, the system may play background music (e.g., mood music, etc.) or may make particular sounds (e.g., beeps, etc.). In another example, the system may convey affects including music, sound, lights, or pictures. Such content may be retrieved from a database of appropriate effects.

In some implementations, when the user queries the system, the system may provide selected music and/or sounds and lights conforming to the general mood of the query (e.g., happy, sad, etc.). With a receptive response from the user the agent confirms the diagnosis of constructive user responses and takes the next appropriate interaction with the user.

In some implementations, the system may convey visual cues along with audio cues. Such cues may include, for example, colors, photos, videos, or even an avatar of the system with the capacity to show emotion to the user. These may be informed by user television viewing preferences.

At block 208, the system observes at least one change in one or more of the responses, wherein the at least one change is responsive to the at least one modified behavior. The system assess the success of different modifications by observing resulting responses from the user. In various implementations, at least one change in one or more of the responses comprises a positive reaction or a negative reaction. For example, if the user shows a positive change such as smiling more, or becoming more interactive, the system would log the positive change in the user's responses. In contrast, if the user shows a negative changes such as smiling less, or becoming less interactive, the system would log the negative change in the user's responses.

In various implementations, the responses or feedback from the user may be implicit or explicit. For example, in some implementations, the system may look for facial expressions. In some implementations, the system may receive explicit feedback from user indicating that the user likes or does not like particular modified behavior from the system. The system may continuously alter its interaction mode as needed or to optimize interaction with the user.

In some implementations, the system may introduce other predetermined behavior. For an example, the system may proactively inform the user of upcoming sports events or a movie schedule. In response, the user might explicitly expresses positive or negative feedback (e.g., "Keep notifying me of sports events." or "I'm not interested." etc.). Or, the user may behave in a way that implies positive or negative reaction. For example, the user might actively use the information to schedule a TV recording, or user might sound unenthusiastic or annoyed when responding, etc. The system logs these responses, and, over time, forms an appropriate level of "proactiveness" that is appropriate for the particular user.

At block 210, the system interacts with the user based on a second behavior pattern, wherein the second behavior pattern includes one or more of the predetermined behaviors and the modified behavior. Over time, the personality that the system conveys evolves and adapts to each user.

Such emotional or empathetic interaction to a user's query conveys a deeper sense of understanding by the system and greatly enhances the user experience. Implementations may provide non-verbal communication when appropriate, which may result in a greater trust and bonding with the system.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 3:
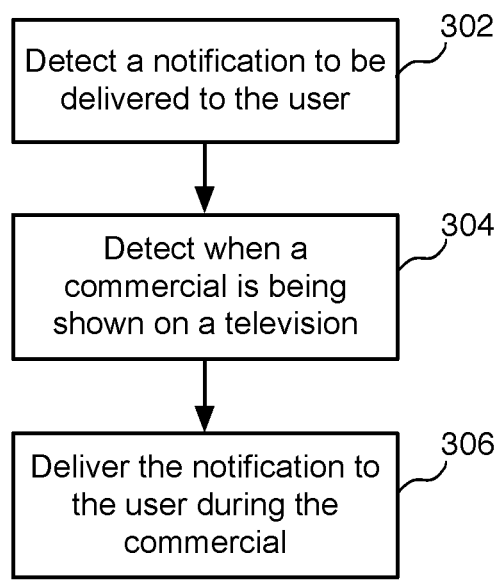
FIG. 3 illustrates an example flow diagram for adapting interactions with a television user, according to some implementations.

FIG. 3 illustrates an example flow diagram for adapting interactions with a television user, according to some implementations. Referring to both FIGS. 1 and 3, a method is initiated at block 302, where the system detects a notification to be delivered to the user.

At block 304, the system detects when a commercial is being shown on a television. The system may detect commercials based on volume changes, black frames, set times, etc.

At block 306, the system delivers the notification to the user during the commercial. As a result, the system avoids unwanted interruptions while the user is enjoying television content. This allows the user to enjoy television with minimal interruptions (e.g., pop-up notifications) while the user is watching their primary content. This enhances the viewing experience.

In some implementations, the system may prioritize notifications. The system may deliver some predetermined notifications during the primary content. For example, the system may deliver a notification from a smart doorbell (e.g., pizza delivery, etc.) or from a particular person (e.g., family member, etc.).

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
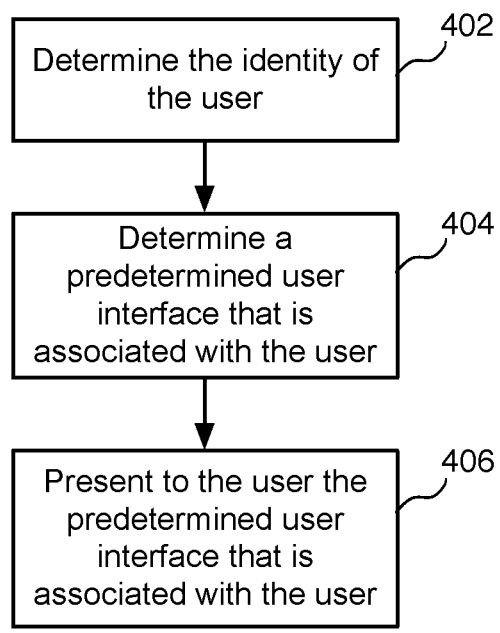
FIG. 4 illustrates an example flow diagram for adapting interactions with a television user, according to some implementations.

FIG. 4 illustrates an example flow diagram for adapting interactions with a television user, according to some implementations. As described in more detail herein, implementations optimize interaction for the specific user. Referring to both FIGS. 1 and 4, a method is initiated at block 402, where the system determines the identity of the user. The system may use a built-in camera and facial recognition, and a built-in mic and voice recognition to detect who is using the television. The system may also determine a usage signature of the user (e.g., method of operation such as remote control, voice, phone control, etc.).

At block 404, the system determines a predetermined user interface that is associated with the user. The system switches to a profile of the particular user and sub-profile (e.g., current control method), which carries some associated information about which user interface (UI) patterns and settings are preferred for that user.

The system may access a library of different UI patterns to be used for various situations. Each pattern may be given a priority. In some implementations the system collects all the available factors (e.g., person, ability level, control method, etc.) and weighs those factors. The system then selects the best UI pattern for the situation. The user may also manually enter settings and select some priority levels or patterns that the user prefers.

In some implementations, the system may store and access a user's viewing preferences in order to help the system determine or suggest particular UI settings. For example, a user who has a preference for watching sporting might want notifications of upcoming sporting events. A user who has a preference for music programs might want background music to be played with some user interfaces.

At block 406, the system presents to the user the predetermined user interface that is associated with the user. A system seamlessly and automatically switches between different UI patterns and settings based on who is operating the television. For example, the system adapts to users with specific preferences (e.g., easy controls for younger users, etc.) and/or impairments (e.g., vision, hearing, mobility, etc.).

Implementations allow users to operate the television in the best way for them without actively hunting through settings for particular controls. Implementations also encourage smoother operation of voice by displaying voice UI on the first attempt to use it. In multi-person households, the system automatically switches between optimal methods, giving each user a highly personalized experience.

In some implementations, the system modifies the controls of to the access capability/limitations of the user by identifying the user. The system accesses the user's access/capability/limitation profile, and identifies the appropriate UI for the user. For example, a user with blindness may need the television to have a screen reader function) or have voice-over enabled. The system may automatically turn such features on for that user, and may turn those features off for other users. In another example, the system may speak in a particular language associated with the user.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 5:
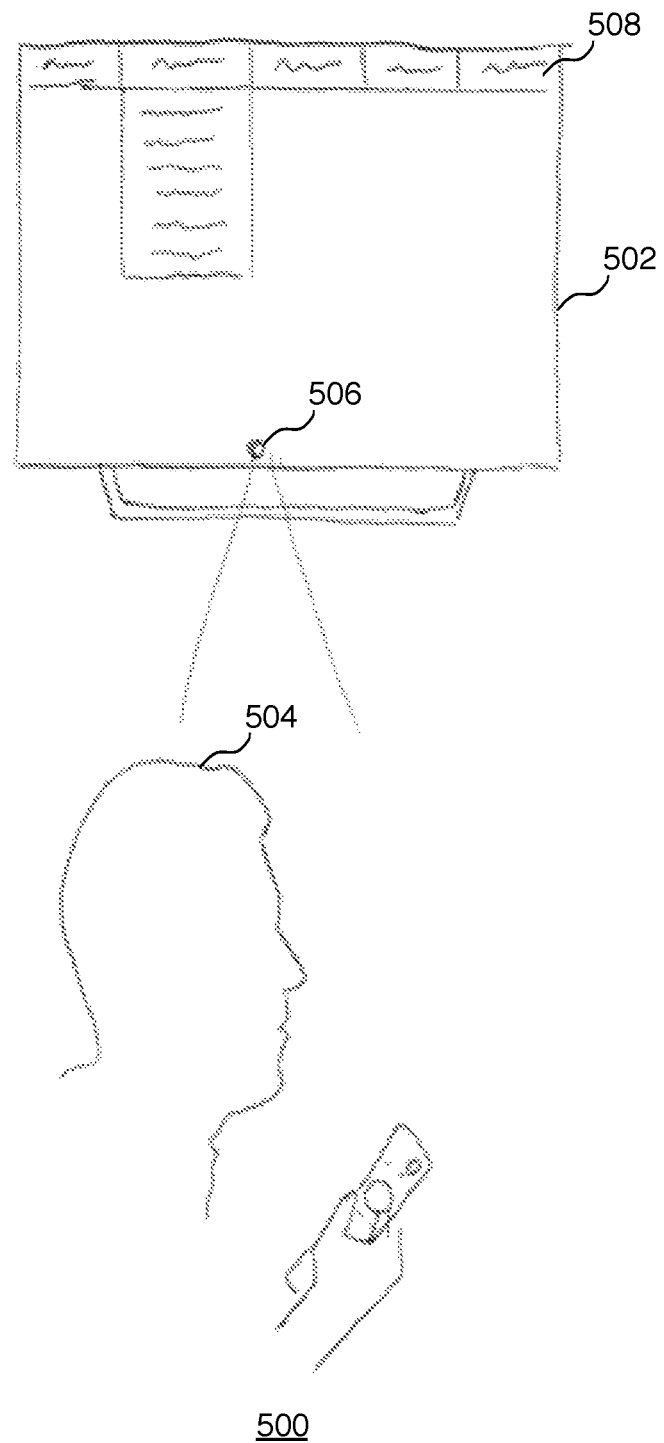
FIG. 5 illustrates a block diagram of an example television environment, which may be used for some implementations described herein.

FIG. 5 illustrates a block diagram of an example television environment 500, which may be used for some implementations described herein. Shown is a television 502 and a user 504 interacting with television 502. In this example scenario, when the system recognizes user 504 with a camera 506, the system displays a UI 508 that is appropriate for user 504. UI 508 is a menu-style UI pattern that is preferred by user 504.

In some implementations, the system accesses a library of different UIs, which may be stored by the system or accessed in the cloud. For example, the library may include traditional menu UIs, graphical UIs, etc.

Figure 6:
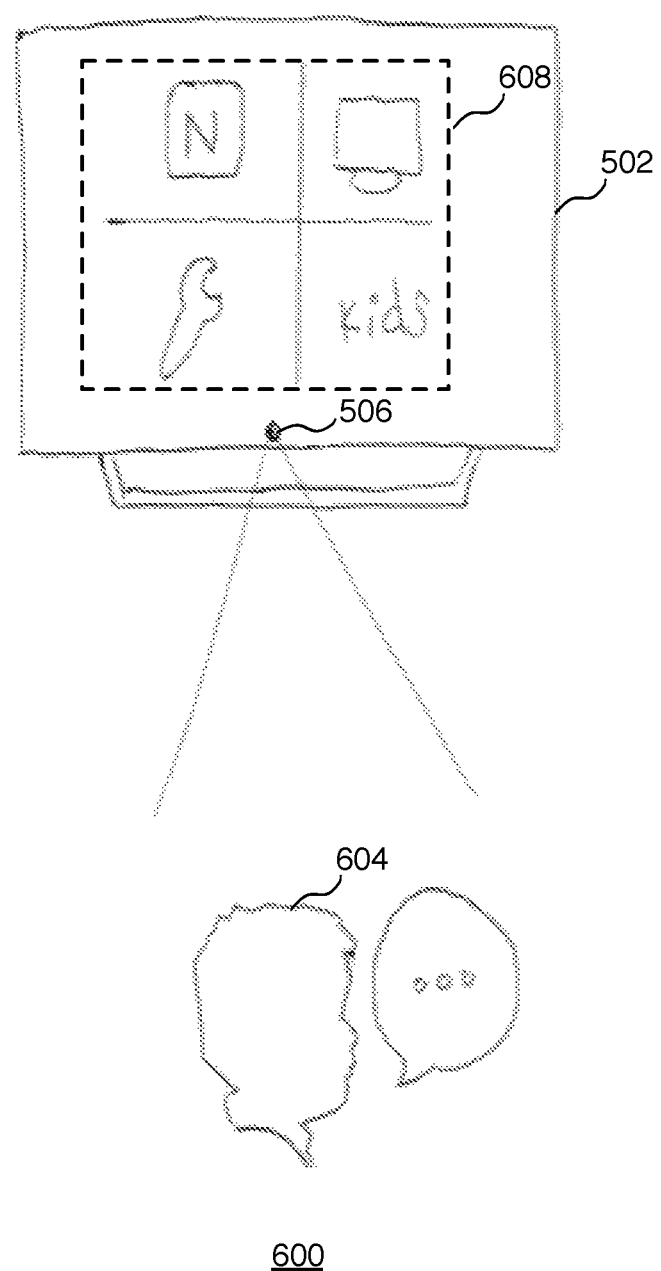
FIG. 6 illustrates a block diagram of an example television environment, which may be used for some implementations described herein.

FIG. 6 illustrates a block diagram of an example television environment 600, which may be used for some implementations described herein. Shown is the same television 502 as in FIG. 5, and a different user 604 interacting with television 502. In this example scenario, when the system recognizes user 604 with a camera 506, the system displays a UI 608 that is appropriate for user 504. UI 508 is a graphical-style UI pattern that is preferred by user 604.

Figure 7:
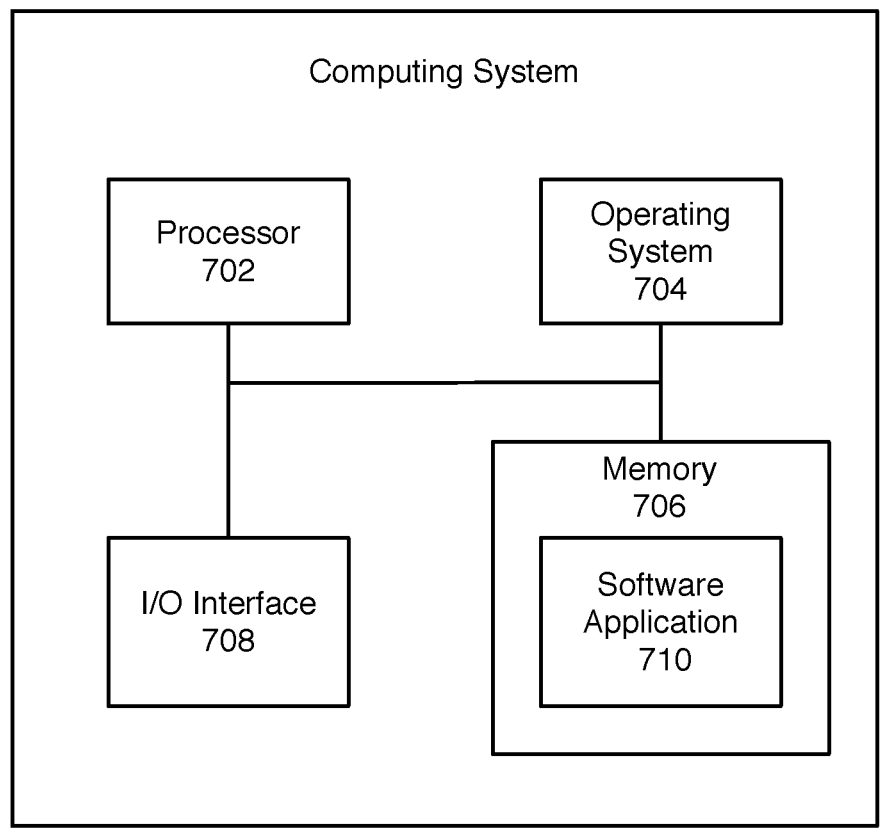
FIG. 7 illustrates a block diagram of an example computing system 700, which may be used for some implementations described herein.

FIG. 7 illustrates a block diagram of an example computing system 700, which may be used for some implementations described herein. For example, computing system 700 may be used to implement television 102 of FIG. 1, as well as to perform implementations described herein. In some implementations, computing system 700 may include a processor 702, an operating system 704, a memory 706, and an input/output (I/O) interface 708. In various implementations, processor 702 may be used to implement various functions and features described herein, as well as to perform the method implementations described herein. While processor 702 is described as performing implementations described herein, any suitable component or combination of components of computing system 700 or any suitable processor or processors associated with computing system 700 or any suitable system may perform the steps described. Implementations described herein may be carried out on a user device, on a server, or a combination of both.

Computing system 700 also includes a software application 710, which may be stored on memory 706 or on any other suitable storage location or computer-readable medium. Software application 710 provides instructions that enable processor 702 to perform the implementations described herein and other functions. Software application may also include an engine such as a network engine for performing various functions associated with one or more networks and network communications. The components of computing system 700 may be implemented by one or more processors or any combination of hardware devices, as well as any combination of hardware, software, firmware, etc.

For ease of illustration, FIG. 7 shows one block for each of processor 702, operating system 704, memory 706, I/O interface 708, and software application 710. These blocks 702, 704, 706, 708, and 710 may represent multiple processors, operating systems, memories, I/O interfaces, and software applications. In various implementations, computing system 700 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
   one or more processors; and
   logic encoded in one or more non-transitory computer-readable storage media for execution by the one or more processors and when executed operable to perform operations comprising:
   determining an identity of a user;
   determining a control method of the user, wherein the control method comprises operating a remote control;
   accessing a library of different user interface (UI) patterns to be used for various situations, wherein one or more UI patterns of the different UI patterns are associated with the user;
   selecting a UI pattern of the one or more UI patterns associated with the user based on a situation of the various situations, wherein the situation comprises the determined identity of the user and the determined control method of the user;
   interacting with the user based on a first behavior pattern of the system and based on the UI pattern that is selected, wherein the first behavior pattern includes one or more predetermined behaviors, and wherein the predetermined behaviors include the system interacting with the user;
   observing one or more responses from the user, wherein the one or more responses are responsive to the one or more predetermined behaviors;
   modifying at least one of the predetermined behaviors, wherein modifying the at least one predetermined behavior results in at least one modified behavior, wherein the system modifies one or more voice characteristics of a voice, and wherein the one or more voice characteristic are modified based on one or more of volume, speed, and level of engagement;
   observing at least one change in one or more of the responses, wherein the at least one change is responsive to the at least one modified behavior; and
   interacting with the user based on a second behavior pattern, wherein the second behavior pattern includes one or more of the predetermined behaviors and the modified behavior.

2. The system of claim 1, wherein the at least one modified behavior includes conveying affects to the user.

3. The system of claim 1, wherein the at least one change in one or more of the responses comprises a positive reaction or a negative reaction.

4. The system of claim 1, wherein the logic when executed is further operable to perform operations comprising:
   detecting a notification to be delivered to the user;
   detecting when a commercial is being shown on a television; and
   delivering the notification to the user during the commercial.

5. The system of claim 1, wherein the logic when executed is further operable to perform operations comprising presenting to the user a predetermined UI that is associated with the user.

6. A non-transitory computer-readable storage medium with program instructions stored thereon, the program instructions when executed by one or more processors are operable to perform operations comprising:
   determining an identity of a user;
   determining a control method of the user, wherein the control method comprises operating a remote control;
   accessing a library of different user interface (UI) patterns to be used for various situations, wherein one or more UI patterns of the different UI patterns are associated with the user;
   selecting a UI pattern of the one or more UI patterns associated with the user based on a situation of the various situations, wherein the situation comprises the determined identity of the user and the determined control method of the user;
   interacting with the user based on a first behavior pattern of a system and based on the UI pattern that is selected, wherein the first behavior pattern includes one or more predetermined behaviors, and wherein the predetermined behaviors include the system interacting with the user;
   observing one or more responses from the user, wherein the one or more responses are responsive to the one or more predetermined behaviors;
   modifying at least one of the predetermined behaviors, wherein modifying the at least one predetermined behavior results in at least one modified behavior, wherein the system modifies one or more voice characteristics of a voice, and wherein the one or more voice characteristic are modified based on one or more of volume, speed, and level of engagement;
   observing at least one change in one or more of the responses, wherein the at least one change is responsive to the at least one modified behavior; and
   interacting with the user based on a second behavior pattern, wherein the second behavior pattern includes one or more of the predetermined behaviors and the modified behavior.

7. The computer-readable storage medium of claim 6, wherein the at least one modified behavior includes conveying affects to the user.

8. The computer-readable storage medium of claim 6, wherein the at least one change in one or more of the responses comprises a positive reaction or a negative reaction.

9. The computer-readable storage medium of claim 6, wherein the instructions when executed are further operable to perform operations comprising:
- detecting a notification to be delivered to the user;
- detecting when a commercial is being shown on a television; and
- delivering the notification to the user during the commercial.

10. The computer-readable storage medium of claim 6, wherein the instructions when executed are further operable to perform operations comprising presenting to the user a predetermined UI that is associated with the user.

11. A computer-implemented method comprising:
- determining an identity of a user;
- determining a control method of the user, wherein the control method comprises operating a remote control;
- accessing a library of different user interface (UI) patterns to be used for various situations, wherein one or more UI patterns of the different UI patterns are associated with the user;
- selecting a UI pattern of the one or more UI patterns associated with the user based on a situation of the various situations, wherein the situation comprises the determined identity of the user and the determined control method of the user;
- interacting with the user based on a first behavior pattern of a system and based on the UI pattern that is selected, wherein the first behavior pattern includes one or more predetermined behaviors, and wherein the predetermined behaviors include the system interacting with the user;
- observing one or more responses from the user, wherein the one or more responses are responsive to the one or more predetermined behaviors;
- modifying at least one of the predetermined behaviors, wherein modifying the at least one predetermined behavior results in at least one modified behavior, wherein the system modifies one or more voice characteristics of a voice, and wherein the one or more voice characteristic are modified based on one or more of volume, speed, and level of engagement;
- observing at least one change in one or more of the responses, wherein the at least one change is responsive to the at least one modified behavior; and
- interacting with the user based on a second behavior pattern, wherein the second behavior pattern includes one or more of the predetermined behaviors and the modified behavior.

12. The method of claim 11, wherein the at least one modified behavior includes conveying affects to the user.

13. The method of claim 11, wherein the at least one change in one or more of the responses comprises a positive reaction or a negative reaction.

14. The method of claim 11, wherein the method further comprises:
- detecting a notification to be delivered to the user;
- detecting when a commercial is being shown on a television; and
- delivering the notification to the user during the commercial.

\* \* \* \* \*